United States Patent
Rodriguez et al.

[11] Patent Number: 5,820,242
[45] Date of Patent: Oct. 13, 1998

[54] COMPACT INTEGRATED LCD PROJECTOR

[75] Inventors: Ernesto Melquades Rodriguez, Round Rock; William Edward Haushalter, Austin, both of Tex.

[73] Assignee: Minnesota Mining and Manufacturing Company, St. Paul, Minn.

[21] Appl. No.: 787,075

[22] Filed: Jan. 22, 1997

Related U.S. Application Data

[63] Continuation of Ser. No. 623,729, Mar. 29, 1996, abandoned.

[51] Int. Cl.$^6$ .................................................. G03B 21/14
[52] U.S. Cl. ............................................................ 353/119
[58] Field of Search ................................... 353/119, 123, 353/DIG. 3; 349/5, 58

[56] References Cited

U.S. PATENT DOCUMENTS

| | | | |
|---|---|---|---|
| 4,157,214 | 6/1979 | Hines . | |
| 4,351,592 | 9/1982 | Link et al. . | |
| 4,436,393 | 3/1984 | Vanderwerf . | |
| 4,588,271 | 5/1986 | Emura | 353/66 |
| 4,640,597 | 2/1987 | Okano et al. . | |
| 4,810,087 | 3/1989 | Tachibana et al. . | |
| 4,824,210 | 4/1989 | Shimazaki | 353/119 |
| 4,921,343 | 5/1990 | Ushiro et al. . | |
| 4,943,154 | 7/1990 | Miyatake et al. | 353/31 |
| 4,968,134 | 11/1990 | Shimizu et al. . | |
| 4,969,733 | 11/1990 | Jewison | 353/119 |
| 4,971,436 | 11/1990 | Aoki et al. | 353/31 |
| 5,090,800 | 2/1992 | Ushiro | 353/119 |
| 5,097,322 | 3/1992 | Fairhurst | 358/31 |
| 5,187,510 | 2/1993 | Vogeley et al. . | |
| 5,287,132 | 2/1994 | Suzuki et al. | 353/119 |
| 5,321,450 | 6/1994 | Shapiro et al. | 353/119 |
| 5,343,262 | 8/1994 | Park . | |
| 5,347,324 | 9/1994 | Sasaki et al. . | |
| 5,374,969 | 12/1994 | Kyhl et al. | 353/119 |
| 5,400,095 | 3/1995 | Minich et al. . | |
| 5,416,541 | 5/1995 | Fog . | |
| 5,428,416 | 6/1995 | Rodriguez et al. | 353/119 |
| 5,442,415 | 8/1995 | Chao | 353/119 |
| 5,453,803 | 9/1995 | Shapiro et al. | 353/119 |
| 5,459,539 | 10/1995 | Yamamoto | 353/119 |
| 5,483,253 | 1/1996 | Suganuma et al. | 345/87 |
| 5,483,382 | 1/1996 | Kappel | 359/786 |
| 5,510,861 | 4/1996 | Minich et al. . | |

FOREIGN PATENT DOCUMENTS

| | | |
|---|---|---|
| 0 658 800 A1 | 12/1994 | European Pat. Off. . |
| 3622472 A1 | 1/1988 | Germany . |
| 20030085 | 6/1988 | Japan . |
| 63-144336 | 6/1988 | Japan . |
| WO95/29427 | 11/1995 | WIPO . |

*Primary Examiner*—William Dowling
*Attorney, Agent, or Firm*—Matthew B. McNutt; Nestor F. Ho

[57] ABSTRACT

A compact electronic projector has a display assembly, such as a liquid crystal display panel and associated Fresnel lenses, which is mounted inside the projector body so as to rotate between a storage position in which the display assembly is generally parallel with the projection axis of the device, and a deployed position in which the display assembly is disposed at an oblique angle (such as 90°) with respect to the projection axis. The assembly can thus be rotated to occupy the voids needed for expansion and contraction of the optical beams when the projector is in use, which voids have no useful function when the projector is not in use, and are thus available for component storage. This feature enables saving of a substantial volume of space, making the closed unit compact and easily transported. A linkage may further be provided to cause a projection lens to extend at least partially outside of the body in the deployed position, and to cause the projection lens to retract back inside the body in the storage position. In one embodiment, the body has doors movable between an open position, when the display assembly is in its deployed position, and a closed position, when the display assembly is in its storage position, and the display assembly extends through the doors in the deployed position. An adjustable rear foot may be used to adjusting the pitch angle of the projection axis.

20 Claims, 5 Drawing Sheets

COMPACT INTEGRATED LCD PROJECTOR

This is a continuation of application Ser. No. 08/623,729 filed Mar. 29, 1996, now abandoned.

BACKGROUND OF THE INVENTION

1. Field of the Invention

The present invention generally relates to projection systems, particularly to a compact (briefcase-size) projector where components may be moved to enable compaction for storage, and more particularly to a projector having an electronically addressable display, such as a liquid crystal display.

2. Description of the Prior Art

Overhead, slide and video projectors, as have been historically configured, occupy a considerable volume of space when ready for use. This is not only because the needed components are large but, due to the limitations of optical technology, certain amounts of unoccupied space is needed to accommodate light cones and ventilation ducts. This bulk space can be regarded as a nuisance, or at the least an inconvenience to the user, and as a result considerable effort has been devoted to features that result in a smaller stored unit, that is expanded or opened for actual use.

Examples of the latter are exemplified by U.S. Pat. No. 5,374,969 which claims an overhead projector (OHP) having a collapsible base and a folding lens arm. Another unit that folds for transportation and storage, having a different folding mechanism, is exemplified by the OHP sold by Minnesota Mining and Manufacturing Company (3M—assignee of the present invention under model 2770, where the folding and unfolding mechanism, while complex, is extremely simple to operate. U.S. Pat. No. 4,588,271 describes a different projector that will collapse for storage, yet be rigid for actual use.

In recent years liquid crystal display (LCD) panels have been added to the traditional overhead projector, introducing a new use for an established technology. These panels are electronically addressable, i.e., the appearance of the final image is controlled by electronic signals sent to the panel. The electronic signals may come from a computer, or may be standard video (NTSC) signals, or from other suitable devices. Initially these panels were designed as an addition to a conventional OHP, and were added or removed at will according to the desired mode of use of the OHP unit. As the convenience of electronically generated and stored presentations became appreciated, a new class of presentation device appeared, often referred to as an "integrated projector." Such a unit is capable of taking input from a computer or other signal source, and projecting an image onto a screen. Modem integrated projectors are capable of projecting useful images even in high ambient light conditions. Such units have developed a patent literature of their own, a few examples of which are outlined below.

U.S. Pat. No. 4,943,154 shows a projector that has three "light valves" (a particular form of an addressable liquid crystal display), and a complicated optical path intended to allow the output of a white-light source to be split into red, green and blue components, imaged with the three light valves—one for each color—and then recombined for projection through a single lens. Such optical systems are complicated to manufacture, assemble and maintain, occupy a considerable amount of space, weigh a substantial amount, and have potential efficiency problems.

An alternative method of use is to have a single LCD panel, optical path, and lens, and interpose in succession red, green and blue filters. As each filter moves into the optical path, the appropriate color image is formed on the LCD. Such units have been limited by the ability of the LCD to rapidly respond to changing input signals. They also need a well-engineered filter wheel and associated hardware. For these reasons this method has found little, if any, use.

U.S. Pat. No. 5,097,323 has a projection system that uses transmission-mode LCD's (one for each color), and a three-dimensional optical path (meaning the optical axes can be directed in three dimensions, rather than in the more normal two dimensions). This is not a space saving feature, but can serve to redistribute the use of space so as to yield a smaller footprint.

It is also possible to use what is known as a three-color LCD. This panel has an array of micro filters (red, green and blue) printed onto the face of the display, and these filters are addressed appropriately by the liquid crystal array mounted to register with them. This type of LCD, while a little more complicated to manufacture, has the advantage of needing a single optical system. In addition, the filters and control elements can never lose alignment, and the weight of the LCD need be little more than the weight of a single color unit, thus economizing on weight and space. Additional weight savings are also achieved in the elimination of prisms, filters, mirrors, etc., and their mounts.

U.S. Pat. No. 5,321,450 describes a projector exemplifying these principles. By the use of mirrors and an angled LCD, a low profile is achieved. A lens having its optical axis vertically disposed is used for projection, and a final mirror (that can be folded down) redirects the light along a horizontal path. This mirror is the only component that is moved for storage, and the space saving is minor.

The "EzPro 500" projector, made by CTX OPTO Inc., incorporates a fold-down lens and mirror unit to achieve compactness for storage.

Devices already in use, where compactness is considered a virtue, include laptop computers and related devices, as may be exemplified by U.S. Pat. No. 5,483,253. In these types of units, an LCD panel is hinged at its rear edge so that it may be folded down to become coplanar with the keyboard for storage and transportation. However these units are normally reflective in operation, sometimes are backlit, and sometimes have been made detachable so that the panel may be used on, e.g., an OHP. Recently "palmtop" organizers have also become available. These devices are a small computer, keyboard and LCD panel, and are even smaller than the laptop computers mentioned above. Palmtop units fold for storage, and fit in a pocket. The users seem to appreciate both the small size of the unit in use and the fold down feature for storage.

In spite of the various methods and configurations in the prior art for reducing size and increasing space efficiency, there is still room for improvement, particularly since none of the conventional designs make efficient use of the unoccupied space needed to accommodate light cones in both transmissive and reflective systems. It would, therefore, be desirable and advantageous to devise a compact, integrated LCD projector which took advantage of this unused space, and which further allows quick and easy deployment for use.

SUMMARY OF THE INVENTION

The present invention provides a compact electronic projector generally comprising a body, a light source located in the body, a projection lens located in the body with a line between the light source and the projection lens defining a projection axis, a display assembly having means for creating an image, the display assembly being located in the body and interposed between the light source and the projection lens, and means for rotating the display assembly from a storage position in which the display assembly is generally parallel with the projection axis, to a deployed position in which the display assembly is disposed at an oblique angle with respect to said projection axis. The display assembly may take the form of a transmissive liquid crystal display panel, and the means for moving the display assembly may also be designed to cause the projection lens to extend at least partially outside of the body in the deployed position, and cause the projection lens to retract back inside the body in the storage position. In one embodiment, the body has doors movable between an open position, when the display assembly is in its deployed position, and a closed position, when the display assembly is in its storage position, and the display assembly extends through the doors in the deployed position. A rear foot element may be used to adjusting the pitch angle of the projection axis.

The display assembly (LCD panel) is arranged to pivot about a horizontal axis, in the center of the assembly. The assembly can then be rotated to occupy the voids needed for expansion and contraction of the optical beams when the projector is in use. These voids have no useful function when the projector is not in use, and are thus available for component storage. Such a feature enables saving of a substantial volume of space, making the closed unit compact and easily transported. Further the simplicity of the optical components also produces a lightweight projector, further enhancing portability. Due to the reduction in size, weight and component number, a unit can be produced at relatively low cost without sacrificing performance.

This invention provides a projector that can be addressed electronically and that is capable of providing excellent image quality and brightness, and that can also be folded or reconfigured for storage and transportation, such that the latter form is both compact and easy to transport. For storage, the major benefits conferred by this reconfiguration are reduction of total volume of the unit, and the absence of protruding parts that could otherwise be damaged. It has been found that, for transportation, it is convenient to have one dimension of the unit as small as possible (i.e., a low profile). This enables a carrying handle to be attached to the unit and transported easily using only one hand. Projectors that have more equilateral shapes (e.g., cubic) need two hands for transportation, or when transported in one hand interfere with easy progress. Further, if the unit is engineered to have a relatively smooth profile or exterior it will suffer less damage if accidentally brought into forceful contact with other objects, and is less likely to interfere with the motion of the person transporting it. Thus the most convenient form for transportation is that of a suitcase, briefcase, or the like.

BRIEF DESCRIPTION OF THE DRAWINGS

The invention will best be understood by reference to the accompanying drawings, wherein.

DESCRIPTION OF THE PREFERRED EMBODIMENT

Figure 1:
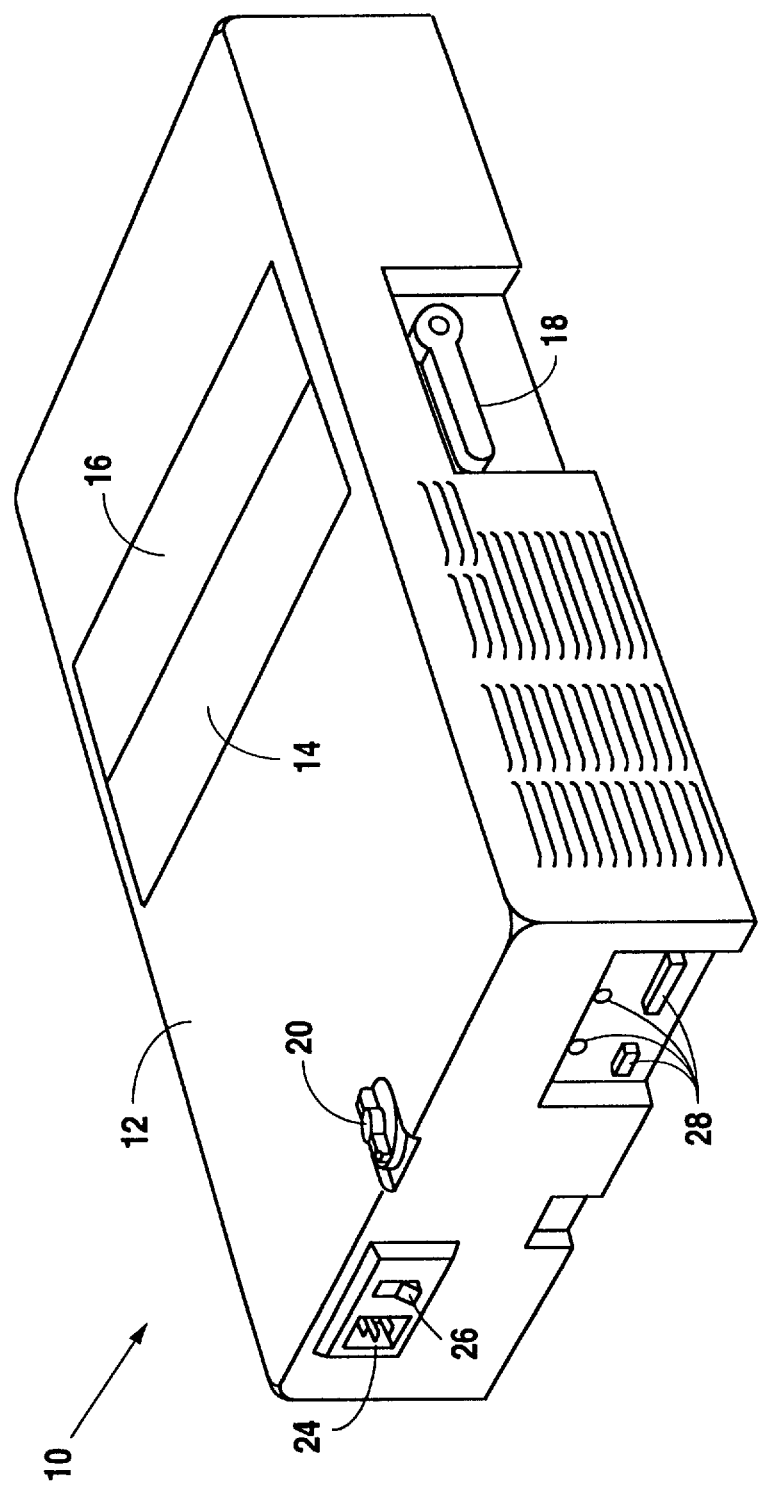
FIG. 1 is a perspective view of one embodiment of the compact integrated LCD projector of the present invention shown in the storage/transportation state.

With reference now to the figures, and in particular with reference to FIG. 1, there is depicted one embodiment 10 of the compact, electronic projector of the present invention. Exterior features of projector 10 include a case or body 12, two upper retracting doors 14 and 16, an actuation button 18, a rear foot adjustment knob 20, a receptacle 24 for a power supply cable, a power (on/off) switch 26, and one or more ports providing various types of electrical connectivity (such as video and data rivers), each indicated as 28. In this embodiment body 12 is box-like, and its upper surface (which includes doors 14 and 16) is planar and generally parallel with its lower, planar surface (in the storage position). This shape provides a particularly low profile, but those skilled in the art will appreciate that other profiles can be provided which are not as rectangular as projector 10. Body 12 may be constructed of any durable material, preferably a lightweight polymer such as acrylonitrile butadiene styrene (ABS) or polycarbonate.

Figure 2A:
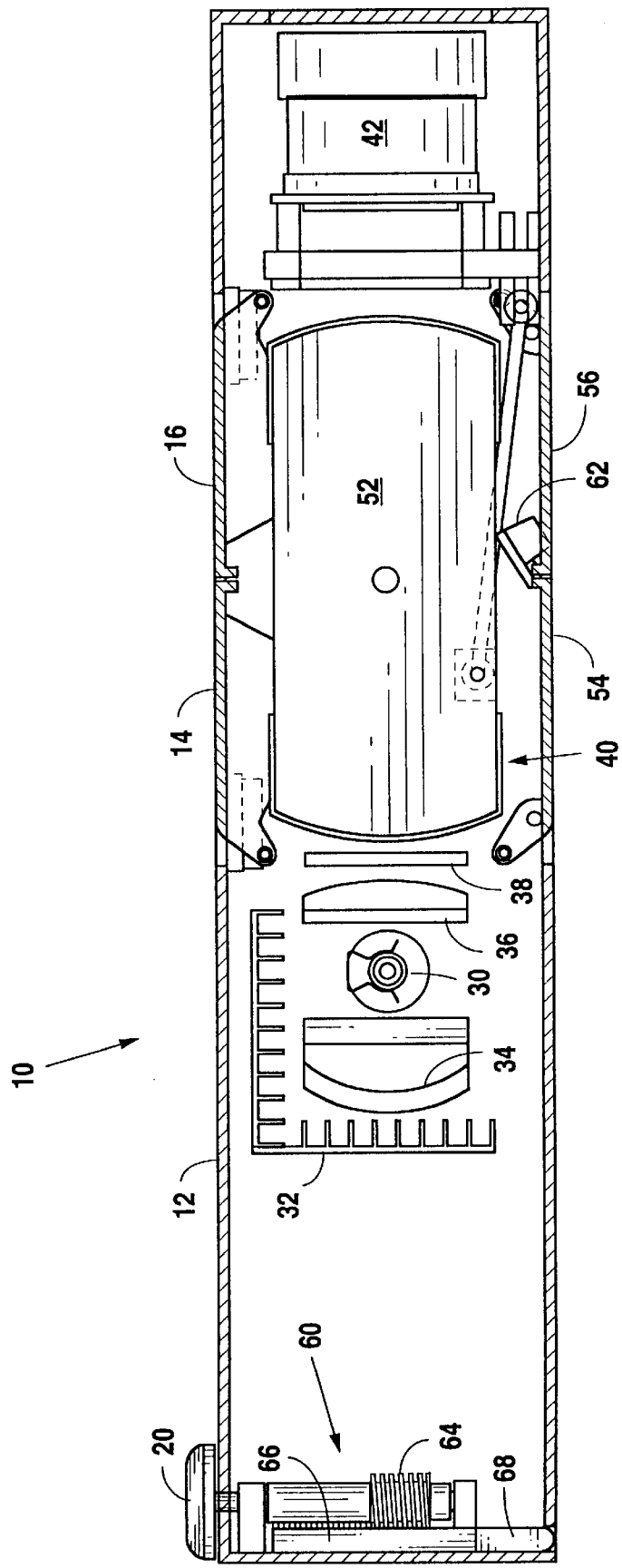
FIG. 2A is a sectional view of the projector of FIG. 1, also shown in the storage/transportation state.
Figure 2B:
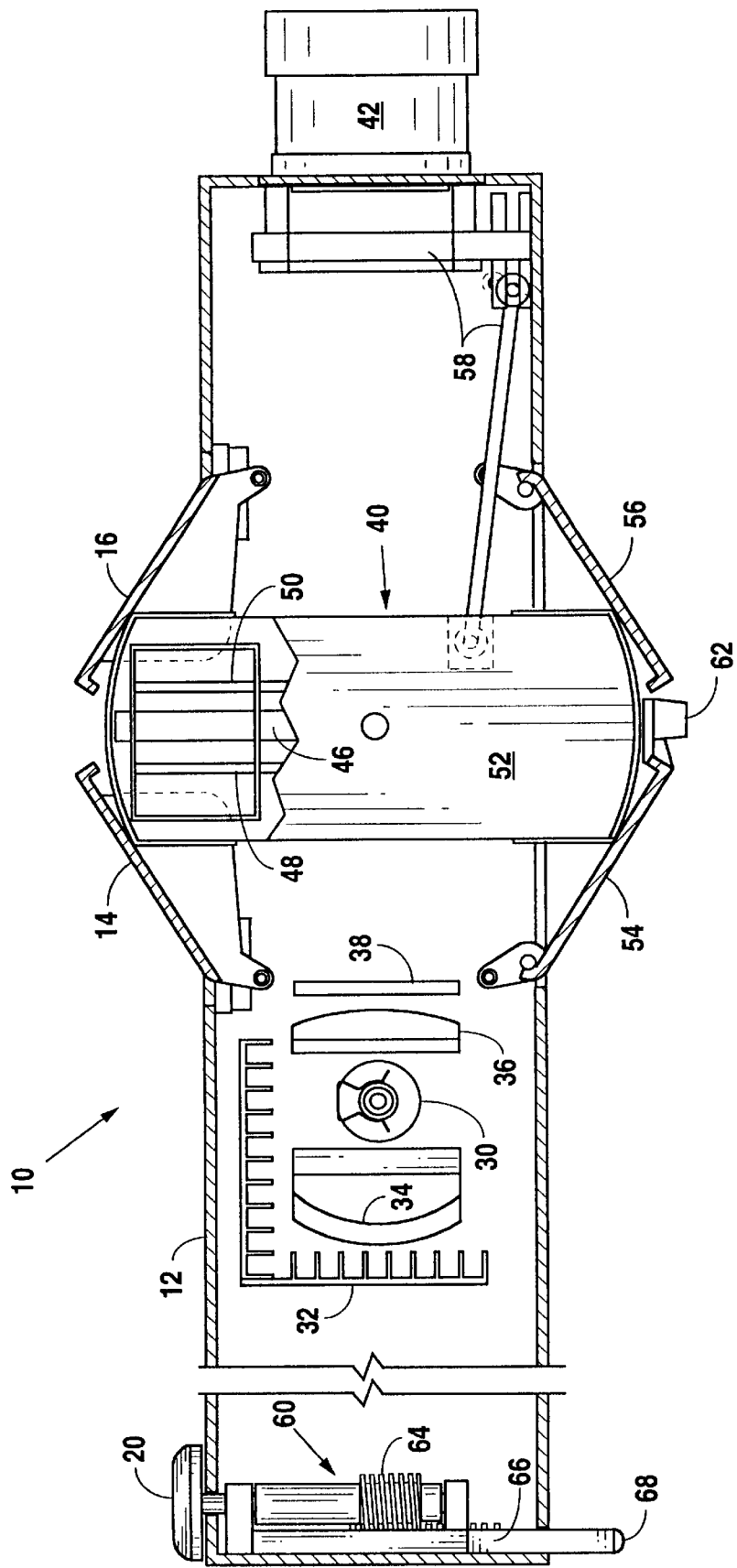
FIG. 2B is a sectional view similar to FIG. 2A but showing the projector in the deployed state.

FIGS. 2A and 2B are longitudinal cross-sections of projector 10 depicting its storage/transportation state and its deployed state, respectively, and show that projector 10 is additionally comprised of a light source 30 with a nearby heat sink 32, a collimator (parabolic reflector) 34 and condenser lens 36 oppositely disposed about light source 30, an infrared filter (hot mirror) 38 proximate condenser lens 36, a display assembly 40, and a projection lens 42. All of these components are located in body 12 although, as seen in FIG. 2B, display assembly 40 and projection lens 42 protrude from body 12 when projector 10 is deployed. Display assembly 40 is pivotally or rotatably attached to the inside of body 12 in such a manner that, in the deployed state, display assembly 40 is generally perpendicular to the light path, but in the storage state it is generally parallel to this light path and occupies the space that is reserved for the light cone during operation.

In referring to the cross-sectional views of FIGS. 2A and 2B, the term "longitudinal" is used to describe a direction of the projector which coincides with the projection axis, i.e., the generally straight line between light source 30 and projection lens 42. This term is appropriate for the particular embodiment depicted, but should not be construed in a limiting sense. Other embodiments may employ folded optical paths such as by the use of mirrors, catadioptric Fresnel lenses, etc., and (while these components might add to the cost of the device and be less desirable for other reasons) such a device could still benefit from the present invention. Specifically, a lower profile is imparted as long as the display assembly is moved into a storage position in which the assembly is generally parallel with the effective direction of the light beam in the region of the display assembly. Also, while it is certainly preferably to have the light striking the LCD panel at a generally normal angle during use, this is not a critical requirement since substantial space savings can be achieved without a full 90° rotation of the panel assembly, i.e., with the light striking the panel at an oblique but non-orthogonal angle. A "keystone" correction option (to modify the shape of the image) can even be obtained through selection of the angle of rotation of the display panel. A stop pin or block (not shown) formed on the inside of body 12 prevents display assembly 40 from rotating too much.

Light source 30 is preferably a high-intensity source such as an EVD (halogen) lamp or a series of high-output metal halide lamps (e.g., 250 watt, 400 watt, 575 watt) available from Osram (part of Sylvania Co. of Germany) or Philips Electronics of the Netherlands. It is connected to a 12 volt DC power supply 44 located in body 12 (see FIG. 3). In the depicted embodiment, heat sink 32 consists of two ribbed strips about 10"(25.4 cm) long, constructed of 5052 aluminum extrusion. Condenser lens is preferably plano-convex and constructed of a borosilicate glass such as Pyrex (a trademark of Corning, Inc.). IR filter 38 is a conventional hot mirror such as those available from Bausch & Lomb.

Display assembly 40 can take on various forms, such as a transmissive LCD panel, a light valve, or a micromirror array. In the embodiment of projector 10, display assembly 40 includes an LCD panel 46, such as the 6.4"(16.3 cm) panel available from Sharp of Japan or Liesegang of Germany, and two Fresnel lenses 48 and 50, secured in a housing 52. A fan 55 (see FIG. 3) is mounted inside housing 52 to cool panel 46. The entire display assembly is arranged to pivot about a horizontal axis, in the center of the assembly. The assembly can then be rotated to occupy the voids needed for expansion and contraction of the optical beams when the projector is in use. These voids have no useful function when the projector is not in operation, and are thus available for component storage. Such a feature enables saving a substantial volume of space, making the closed unit compact and easily transported. Display assembly 40 does not have to be rotatably mounted, e.g., a linkage of bars could be used to move it, but pivotal attachment is simpler.

Along with the pivoting of the display, means may be provided to ensure protection of the display in storage or in use. This means may consist of moveable flaps or doors that provide a substantially contiguous exterior form when the unit is in use of in storage. As seen in FIGS. 2A and 2B, these doors include doors 14 and 16, as well as lower doors 54 and 56 all of which are pivotally attached to body 12. When display assembly 40 is rotated for use, these doors move aside to allow passage. The doors not only protect the display assembly and provide a more aesthetically appealing design, but also reduce light leakage.

Each of the doors is preferably spring-loaded so as to automatically retract upon rotation of display assembly 40 to the stowed position. Projection lens 42 may also be coupled to display assembly 40, such as by linkages 58, so as to automatically retract projection lens 42 when projector 10 is configured in the storage state (and to automatically extend projection lens 42 outside of body 12 when configured in the deployed state). Display assembly 40 itself is preferably biased by an over-center spring which is engaged by a latch attached to button 18. This latch also locks the apparatus when stowed (i.e., it locks doors 14, 16, 54 and 56, and keeps projection lens 42 retracted). An iris or lens cover (not shown) may also be provided to impart additional protection to projection lens 42 when it is retracted. A lever (not visible in the figures) attached to the side of body 12 and attached to display assembly housing 52 may be used to simultaneously move all of the parts to the stowed position.

FIGS. 2A and 2B also depict a rear foot assembly 60 which, with feet 62 formed on lower retractable door 54, completes a tri-pod approach to leveling the unit. It can be seen that, in the deployed position, display assembly 40 rests on feet 62 and so supports body 12 and also eliminates the need to lock the LCD module in an open position in case the machine slides-across the table. Foot assembly 60 includes adjustment knob 20 which is fastened to a worm gear or threaded member 64, and a rack or travel guide 66 that has one end 68 fashioned into a foot. The rear end of projector 10 may thus be raised by twisting knob 20 clockwise to adjust the pitch angle of the projection axis when the projector is resting on a support surface (i.e., to adjust the height of the projected image). While twisting of the knob counterclockwise will lower the rear end, foot assembly 60 is advantageously provided with a feature that allows a quick release of travel guide 66 and retraction of foot 68 into body 12. Travel guide 66 is fitted into a cavity or holder formed in or attached to body 12, but it is not rigidly attached thereto. Rather, it is provided with sufficient tolerance to allow it to pull away from worm gear 64. A spring attached to travel guide 66 then automatically retracts it. Friction from the spring actually holds guide 66 against gear 64 preventing it from retracting under normal circumstances, but the user can push knob 20 laterally to displace guide 66 away from gear 64 and allow the spring to retract it.

Figure 3:
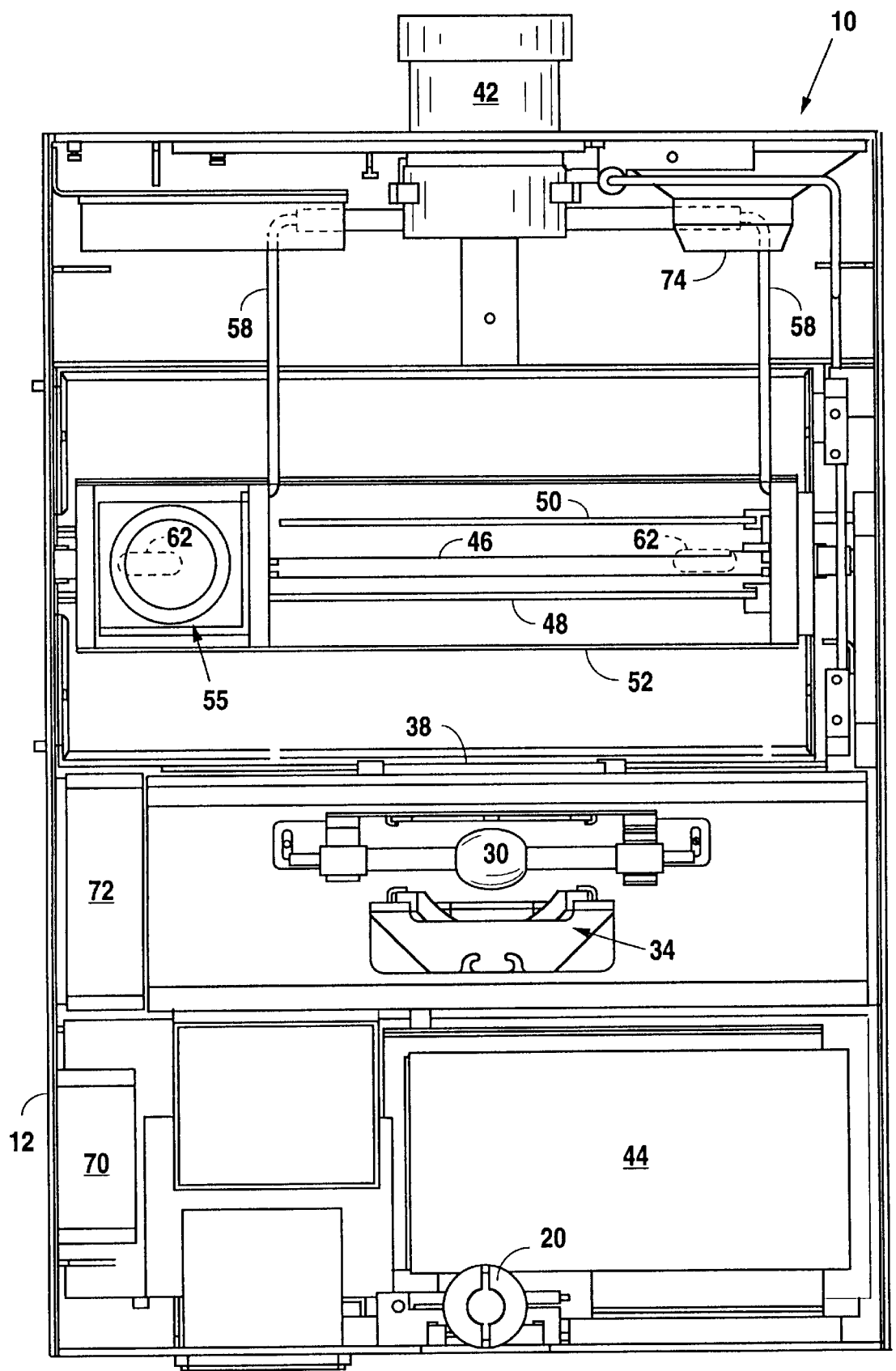
FIG. 3 is a top plan view of the projector with the upper surface thereof removed, also shown in the deployed state.
Figure 4:
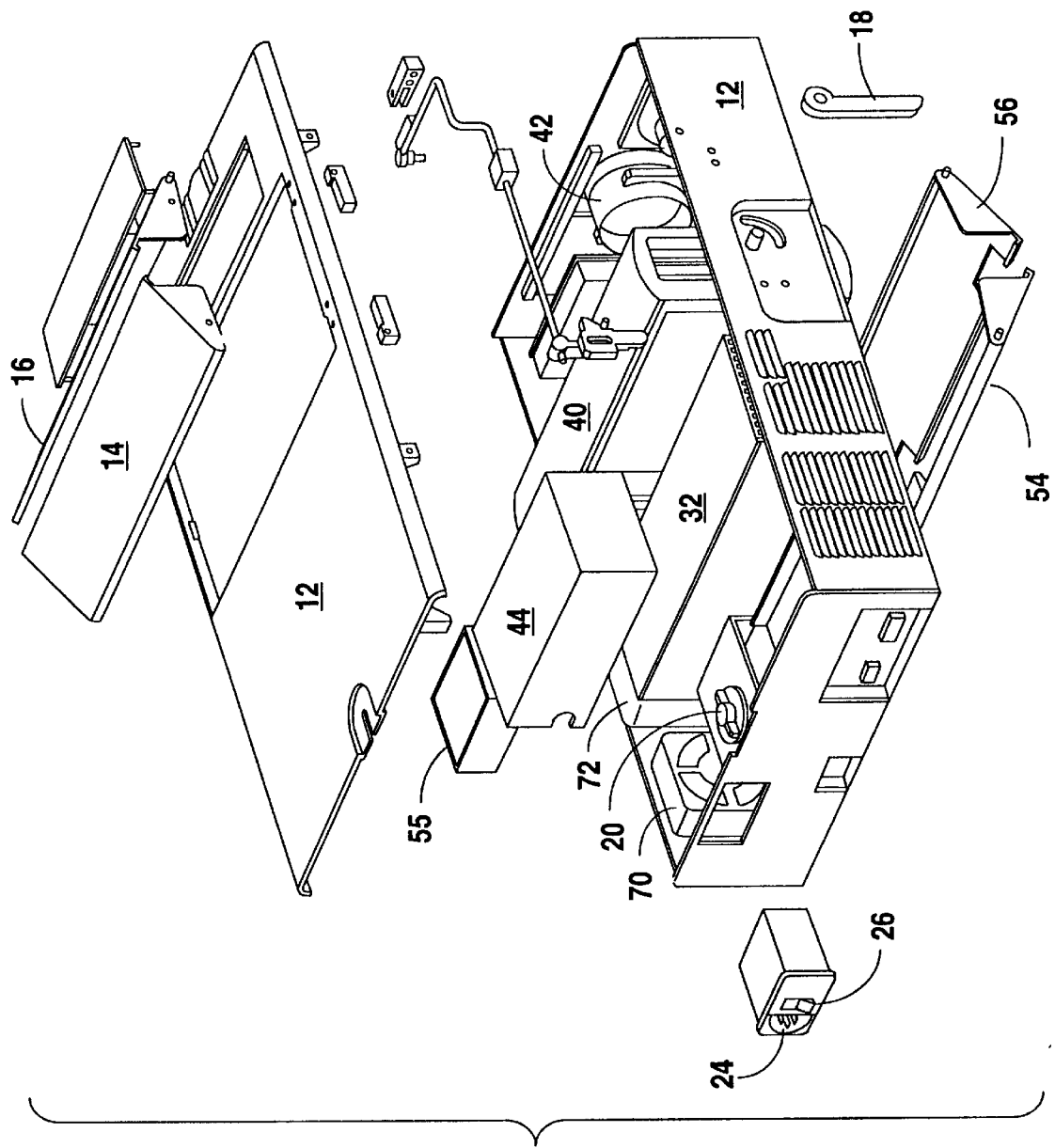

With further reference to FIG. 3, other components of projector 10 can be seen. These include a second fan 70 for cooling power supply 44, a third fan 72 for cooling the optical module which is surrounded by heat sink 32 for which conduction and convection thermal cooling occurs, and an optional speaker 74. The additional electronics (LCD control) may be conventional and are beyond the scope of the present invention except that, consistent with the goal of compactness, the electronic components are preferably packaged in a relatively small subassembly. An appropriate package is available from Neo Systems under model no. MDI-0344, and includes functionality for data and video to drive the LCD panel. With such commercially available components, projector 10 is about 3.4"×10.9"×16.3" (8.6 cm×27.7 cm×41.4 cm), but with custom components, a smaller size of 3.25"×10.5"×14.75" (8.3 cm×26.7 cm×37.5 cm) is feasible.

Projector 10 has a number of advantages besides compactness and ease of transportation. The simplicity of the optical components produces a lightweight projector, further enhancing portability. Due to the reduction in size, weight and number of components, a unit can be produced at relatively low cost without sacrificing performance. The projector can be addressed electronically and is capable of providing excellent image quality and brightness. For storage, the major benefits conferred by this reconfiguration are reduction of total volume of the unit, and the absence of protruding parts that could otherwise be damaged. A carrying handle (not shown) may also be attached to the unit to easily transport it using only one hand. Since the unit is engineered to have a relatively smooth profile or exterior, it suffers less damage if accidentally brought into forceful contact with other objects, and is less likely to interfere with the motion of the person transporting it. Finally, the auto-deployment mechanism permits the user to quickly set up for his/her presentation, enhancing its effectiveness.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A display device comprising:

a light source;

a display assembly having means for creating an image;

means for directing light from said light source to said display assembly, defining a light beam direction;

a projection lens positioned to receive the image created by said display assembly; and means for moving said display assembly from a storage position to a deployed position in which said display assembly is disposed at an oblique angle with respect to said light beam direction.

2. The display device of claim 1 wherein said means for directing light from said light source to said display assembly includes:

a reflector located adjacent said light source, opposite said display assembly; and a condenser lens interposed between said light source and said display assembly.

3. The display device of claim 1 wherein said display assembly includes a liquid crystal display panel.

4. The display device of claim 1 wherein said means for moving said display assembly allows said display assembly to rotate between said storage and deployed positions.

5. The display device of claim 1 wherein said oblique angle is approximately 90°.

6. The display device of claim 1 wherein:

said light source, said display assembly, said means for directing light, and said projection lens are all located in a common body; and said means for moving said display assembly also causes said projection lens to extend at least partially outside of said body in said deployed position, and causes said projection lens to retract back inside said body in said storage position.

7. The display device of claim 1 wherein:

said light source, said display assembly, said means for directing light, and said projection lens are all located in a common body;

said body has doors movable between an open position, when said display assembly is in its deployed position, and a closed position, when said display assembly is in its storage position; and said display assembly extends through said doors in said deployed position.

8. The display device of claim 1 wherein said means for moving said display assembly also provides means for modifying the shape of the image.

9. The display device of claim 4 wherein said display assembly rotates along an approximate centerline thereof.

10. The display device of claim 7 wherein said display assembly, when in its deployed position, is adapted to support said body.

11. A display device comprising:

a body;

a light source located in said body;

a projection lens located in said body, a line between said light source and said projection lens defining a projection axis;

a display assembly having means for creating an image, said display assembly being located in said body and interposed between said light source and said projection lens; and means for rotating said display assembly from a storage position to a deployed position in which said display assembly is disposed at an oblique angle with respect to said projection axis.

12. The display device of claim 11 wherein said display assembly includes a transmissive liquid crystal display panel.

13. The display of claim 11 wherein said means for moving said display assembly also causes said projection lens to extend at least particular outside of said body in said deployed position, and causes said projection lens to retrack back inside said body in said storage position.

14. The display of claim 11 wherein:

said body has doors movable between an open position, when said display assembly is in its deployed position, and a closed position, when said display assembly is in its storage position; and said display assembly extends through said doors in said deployed position.

15. The display device of claim 11 further comprising means for adjusting a pitch angle of said projection axis when said body is resting on a support surface.

16. The display device of claim 11 wherein said means for moving said display assembly also provides means for modifying the shape of the image.

17. The display device of claim 12 wherein said display assembly rotates along an approximate centerline of said liquid crystal display panel.

18. The display device of claim 13 wherein:

said body has doors movable between an open position, when said display assembly is in its deployed position, and a closed position, when said display assembly is in its storage position; and said display assembly extends through said doors in said deployed position.

19. The display device of claim 15 wherein said display assembly, when in its deployed position, is adapted to support said body.

20. A compact, integrated LCD projector comprising:

a body having upper and lower generally planar and parallel surfaces, each of said upper and lower surfaces having at least one door movable between an open position and a closed position;

a high-intensity light source located in said body;

a projection lens located in said body, a line between said light source and said projection lens defining a projection axis;

a display assembly having means for creating an image, said display assembly being located in said body and interposed between said light source and said projection lens, and including an electronically-addressable, transmissive liquid crystal display;

means for rotating said display assembly, along an approximate centerline thereof, from a storage position to a deployed position in which said display assembly is disposed at an oblique angle with respect to said projection axis, said display assembly extending through said body doors in said deployed position;

means, linked to said rotating means, for causing said projection lens to extend at least partially outside of said body in said deployed position, and causing said projection lens to retract back inside said body in said storage position; and means for adjusting a pitch angle of said projection axis when said body is resting on a support surface.

* * * * *